United States Patent [19]

Locatelli et al.

[11] Patent Number: 4,518,755
[45] Date of Patent: May 21, 1985

[54] IMIDO COPOLYMERS

[75] Inventors: Jean L. Locatelli, Vienne; Bernard Rollet, Lyons, both of France

[73] Assignee: Rhone-Poulenc Industries, Paris, France

[21] Appl. No.: 43,813

[22] Filed: May 30, 1979

[30] Foreign Application Priority Data

May 30, 1978 [FR] France .................. 78 16012

[51] Int. Cl.³ ............................................ C08F 22/40
[52] U.S. Cl. .................................... 526/262; 548/521
[58] Field of Search ................. 260/326.26; 526/262; 548/521

[56] References Cited

U.S. PATENT DOCUMENTS

| | | | |
|---|---|---|---|
| 2,790,787 | 4/1957 | Tawney | 526/262 |
| 3,018,290 | 1/1962 | Sauers et al. | 260/326.2 |
| 3,562,223 | 2/1971 | Bargain et al. | 260/326.26 |
| 3,651,012 | 3/1972 | Holub et al. | 526/262 |
| 3,669,930 | 6/1972 | Asahara et al. | 260/326.26 |
| 3,679,639 | 7/1972 | Bargain et al. | 260/326.26 |
| 3,712,933 | 1/1973 | Docloux et al. | 260/326.26 |
| 3,887,582 | 6/1975 | Holub et al. | 260/326.26 |
| 4,035,345 | 7/1977 | Ducloux et al. | 260/326.26 |
| 4,043,986 | 8/1977 | Gruffaz et al. | 260/326.26 |
| 4,160,859 | 7/1979 | Renner et al. | 260/326.26 |

FOREIGN PATENT DOCUMENTS

| | | | |
|---|---|---|---|
| 1394424 | 2/1965 | France | 526/262 |
| 8091 | 1/1977 | Japan | 526/262 |
| 1137592 | 12/1969 | United Kingdom . | |

OTHER PUBLICATIONS

Ferruti et al.; Polymer, vol. 13, pp. 462–464, (10/1972).
Encyclopedia of Polymer Science and Technology, vol. 4, pp. 191–202.

Primary Examiner—Paul M. Coughlan, Jr.
Attorney, Agent, or Firm—Burns, Doane, Swecker & Mathis

[57] ABSTRACT

Novel imido copolymers are prepared by copolymerizing:

[i] a bis-maleimide of the structural formula:

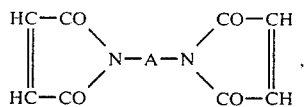

with

[ii] a (meth)acrylic acid amide.

The subject copolymers are applicable to the production of a variety of useful shaped articles, coatings, laminates, foams, and the like.

25 Claims, No Drawings

IMIDO COPOLYMERS

CROSS-REFERENCE TO RELATED APPLICATION

Applicants' copending application, Ser. No. 043,812, filed concurrently herewith, and assigned to the assignee hereof.

BACKGROUND OF THE INVENTION

1. Field of the Invention

The present invention relates to novel thermosetting polymers comprising imide functions, and, more especially, to the copolymerization products of a bis-imide with a (meth)acrylic acid amide.

2. Description of the Prior Art

It is known to this art that heat resistant polyimide resins may be obtained by simple heating of the bis-imides of unsaturated carboxylic acids. Shaped articles molded from such resins, however, are fragile because of their high degree of cross-linking. The reduction of the cross-linking density by means of an addition reaction between the bis-imide and a diamine [see U.S. Pat. No. 3,562,223 and French Pat. No. 1,555,564] or a polyamine-monoamine mixture [see U.S. Pat. No. 3,669,930] has been suggested. These molded shaped articles have been found useful in applications requiring high temperature strength. Nonetheless, in numerous applications which do not require a high thermal index, the difficulty in processing these resins is a pronounced obstacle to their use and development.

SUMMARY OF THE INVENTION

It is the major object of the present invention to provide novel polymers comprising imide groups which are more easily processed than related polymers known to the art. The polymers of the present invention are processed without solvents, by simple hot casting, and, after hardening or curing, yield products having superior mechanical properties. Prior to hardening, the polymers of the present invention are in the form of fluid resins of low viscosity at moderate temperatures, and are thus easily processed. For this reason, they are particularly suitable for molding by simple hot casting and by impregnation techniques. Polymers of the present invention may be used after cooling and grinding, in the form of powders which are remarkably well suited for compression molding, and may be used in association with fibrous or power fillers. The polymers may also be used for the preparation of coatings, for adhesive bonding, in laminated materials which may have a skeleton of mineral, vegetable or synthetic fibers, and for cellular materials or foams, following incorporation of a pore-forming agent therein. Further, the polymers of the present invention may also be used as an impregnating varnish and as an enamel, both without solvent.

The polymers of the present invention are prepared by copolymerization between:

[i] a bis maleimide of the structural formula:

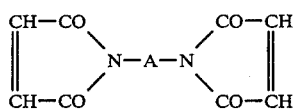

wherein A is a divalent radical, preferably selected from the group comprising phenylene and radicals of the structural formula:

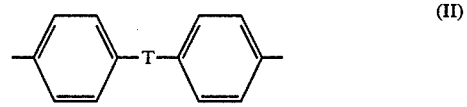

wherein T is a divalent radical, preferably selected from the group comprising —CH$_2$—, —C(CH$_3$)$_2$—, —O— and —SO$_2$—; and

[ii] a (meth)acrylic acid amide comonomer copolymerizable therewith.

DETAILED DESCRIPTION OF THE INVENTION

The bis-maleimides of structural formula (I) are known to the art. Same may be prepared by the methods disclosed in U.S. Pat. No. 3,018,290 and British Patent Specification No. 1,137,592 which are hereby expressly incorporated by reference and relied upon. The following are representative examples of such bis-maleimides:

N,N'-metaphenylene bis-maleimide,
N,N',4,4'-diphenylether bis-maleimide,
N,N',4,4'-diphenyl-2,2-propyl bis-maleimide,
N,N,4,4'-diphenylsulfone bis-maleimide, and
N,N',4,4'-diphenylmethane bis-maleimide.

The latter bis-maleimide is preferentially utilized in consonance with the present invention: obviously, mixtures of the aforementioned bis-maleimides may also be utilized consistent herewith.

A mixture comprising a bis-maleimide of structural formula (I) and a mono-imide, wherein the number of imide groups of the mono-imide is up to 30% of the total number of imide groups in the mixture, may also be used in the present invention.

The (meth)acrylic acid imides [ii] which are copolymerized according to the invention preferably include acrylamide, methacrylamide, and admixtures thereof.

The conditions of polymerization which yield the polymers of the present invention may vary over wide limits. The ratio r is equal to the number of imide groups divided by the number of moles of (meth)acrylic acid amide, and may vary from 0.25 to 8. The polymers of particular interest are those wherein the proportions of the starting material monomers are such that the ratio r is equal to at least 1, and preferably ranges from 1.6 to 3.5.

The reaction temperature too may vary over wide limits, as a function of the nature and of the proportions of the reactants. However, typically the temperature ranges from 90° to 250° C.

The polymers of the present invention can be prepared via bulk polymerization whereby the mixture of the (meth)acrylic acid amide [ii] and the bis-maleimide [i] is heated until a homogeneous liquid results. To obtain a homogeneous liquid composition it is typically not necessary to exceed a temperature of 160° C. Prior to heating the mixture of the reactants, it is advantageous to effect preliminary homogenization. It may be possible to first melt one of the two reactants and then mix the melt with the other reactant.

The polymers of the present invention may also be prepared by heating a mixture of the reactants in an inert organic diluent which is liquid over at least part of the temperature range of the reaction. Suitable as diluents are the polar organic solvents N-methylpyrrolidone, dimethylformamide, dimethylacetamide, N-methylcaprolactam, diethylformamide, N-acetylpyrrolidone, and the cresols. Also suitable as diluents are the various hydrocarbons, chlorinated hydrocarbons, linear or cyclic ethers and nitriles.

Solutions or suspensions of the polymers of the invention may be utilized for a wealth of applications. It is also possible to isolate or separate the polymers of the present invention from any such solution or suspension. For example, the polymers may be isolated by precipitation by means of an organic reagent which is miscible with the solvent used. Advantageously, hydrocarbon solvents are employed which have boiling points not substantially in excess of 120° C. However, in the majority of cases it is not necessary to add such diluents because the initial mixtures are sufficiently fluid at moderate temperatures.

The polymers of the present invention may be prepared in the presence of a free-radical inhibitor, such as phenothiazine or any one of those noted at *Encyclopedia of Polymer Science and Technology*, Vo. 7, pages 644 to 662, which is hereby incorporated by reference.

The polymers of the present invention may be hardened or cured [thermoset] polymers, which are insoluble in conventional solvents and which do not exhibit appreciable softening below the temperature at which softening begins. However, the polymers may also be prepared in the form of prepolymers which are indeed soluble in polar organic solvents and which have a softening point at a temperature below 250° C. These prepolymers may be prepared in bulk by heating the mixture of reactants until a homogeneous or viscous product is obtained, typically at a temperature of from 50° to 180° C. The preparation of these prepolymers may also be carried out in suspension, or in solution, in an organic diluent which is a liquid over at least part of the temperature range of from 50° to 180° C., and preferably the reaction is carried out in a polar organic solvent.

In a second stage, whereby the polymer is obtained from the prepolymer, the resins may be hardened or cured by heating to a temperature up to the order of 300° C., and usually from 150° to 250° C. Optionally, such heating may be preceded by addition of a free-radical initiator to the reaction mix, such as a peroxide, e.g., dicumyl peroxide, di-t-butyl peroxide, t-butyl perbenzoate, azobisisobutyronitrile, or by addition of an anionic polymerization catalyst, e.g., diazobicyclooctane. As another option, an additional shaping operation may be performed upon the reaction mass during the hardening thereof. This shaping operation may be conducted under pressure in excess of atmospheric, or under vacuum. These operations may also be carried out consecutively.

The polymers of the present invention may also comprise an aromatic compound having from 2 to 4 benzene rings, which does not sublime at temperatures less than 250° C. under atmospheric pressure and which has a boiling point in excess of 250° C. The addition of such aromatic compounds is of particular interest in connection with the aforenoted prepolymers, because same typically contribute to a reduction in softening point. Suitable aromatic compounds are described in U.S. Pat. No. 3,679,639, and French Pat. No. 2,046,025, which is hereby incorporated by reference.

The polymers of the present invention may be modified by the addition, prior to hardening, of a monomer M other than an imide which comprises at least one polymerizable

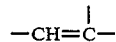

group. Such polymerizable group may be of the vinyl, maleic, allylic or arcylic type. These monomers may contain several

groups, provided, however, that the double bonds are not conjugated. In a single monomer, the polymerizable groups may be of the same type or they may be different types. Both a monomer of the given formula or a mixture of such copolymerizable monomers may be used. Suitable monomers are disclosed in U.S. Pat. No. 4,035,345 and French Pat. No. 2,094,607, hereby expressly incorporated by reference.

The monomer(s) M may be added to the prepolymer or same may be introduced into the mixture of the reactants at any time during the preparation of the polymer. The amount of monomer added is selected such that said monomer constitutes at most 50%, and preferably from 5 to 40%, of the weight of either the prepolymer or the mixture of reagents. The hardening of the reaction mixture modified by the monomer, and of the prepolymer modified by the monomer, is carried out under the reaction conditions specified hereinabove for the unmodified polymerization recipe, and for the unmodified prepolymer, respectively.

The polymers of the present invention may also be modified by the addition, prior to hardening, of an unsaturated polyester. Suitable unsaturated polyesters are described in U.S. Pat. No. 3,772,939 and French Pat. No. 2,102,818. The mode of introduction and the amounts of the unsaturated polyester, together with the mode of hardening the polymer modified by the unsaturated polyester are the same as those mentioned hereinabove with reference to addition of the monomer M comprising a polymerizable site of olefinic unsaturation.

In order to further illustrate the present invention and the advantages thereof, the following specific examples are given, it being understood that same are intended only as illustrative and in nowise limitative.

EXAMPLE 1

80 grams of N,N',4,4'-diphenylmethane bis-maleimide and 20 grams acrylamide were introduced into a reactor which was provided with means for agitation and placed in a bath that was thermostatically maintained at 150° C. The mixture was melted under agitation until a clear, homogeneous, translucent liquid is obtained. The air dissolved in the liquid was eliminated by subjecting the contents of the reactor to a reduced pressure of 200 mm of mercury for 2 minutes. The resulting, degassed liquid mixture was cast into a mold (127×75×4 mm) which had been preheated to temperature of 150° C. The mold was of parallelepipedic shape. The mold was maintained for 6 hours at a temperature of 150° C., then for 2 hours at a temperature of 200° C., and, finally, for 24 hours at a temperature of 250° C. The properties of the object thus obtained are set out in Table 1, below.

EXAMPLE 2

In a second experiment, the preparation as described in Example 1 was repeated, except that a mixture of 85 grams of N,N',4,4'-diphenylmethane bis-maleimide and 15 grams of acrylamide were used. The properties of the shaped article thus obtained are reported in Table 1, below.

EXAMPLE 3

In a third experiment, the preparation as described in Example 1 was repeated, except that a mixture of 80 grams of N,N',4,4'-diphenylmethane bis-maleimide and 10 grams of acrylamide were used. The properties of the shaped article thus obtained are reported in Table 1, below.

TABLE I

| Properties | Example 1 | Example 2 | Example 3 |
|---|---|---|---|
| Initial Flexural Bending Strength (in kg/mm$^2$): | | | |
| at 25° C. | 11.55 | 10.50 | 10.60 |
| at 200° C. | 3.40 | 7.10 | 1.20 |
| Flexural Bending Strength after 1000 hours at 200° C. (in kg/mm$^2$): | | | |
| at 25° C. | 11.0 | 8.95 | 9.80 |
| at 200° C. | | 5.15 | |
| Flexural Bending Strength after 1000 hours at 250° C. (in kg/mm$^2$): | | | |
| at 25° C. | 9.5 | 5.5 | 9.10 |
| at 200° C. | | 2.70 | |
| Initial Flexural Modulus (in kg/mm$^2$): | | | |
| at 25° C. | 340 | 292 | 302 |
| at 200° C. | 174 | 264 | 112 |
| Flexural Modulus after 1000 hours at 200° C. (in kg/mm$^2$): | | | |
| at 25° C. | 276 | 330 | 352 |
| at 200° C. | | 302 | |
| Flexural Modulus after 1000 hours at 250° C. (in kg/mm$^2$): | | | |
| at 25° C. | 297 | 280 | 312 |
| at 200° C. | | 225 | |
| Impact Strength (in j/cm$^3$) (according to PT standard 51-017) | 0.65 | 0.85 | 0.35 |
| Gelling Time at 150° C. (in minutes) | 32 | 41 | 54 |
| L.O.I. Index (according to ASTM Standard D 1621-64) | 33 | 34 | 34 |

EXAMPLE 4

The following were intimately admixed under gradual heating to 115° C.:

(1) 50 g of N,N'-diphenylmethane bis-maleimide,
(2) 50 g of acrylamide, and
(3) 5 g of azodicarbonamide as a blowing agent, and 1 g of a surface-active agent of the polyalkylene glycol laurate type, marketed under the trademark "Cepretrol J".

19 g of the product obtained after homogenation were placed into a receptacle consisting of a steel frame having the dimensions, 75×75×30 mm, wraped in aluminium foil which was folded up along the exterior walls of the frame. The entire assembly was placed between two chromium-plated brass plates and the mold thus formed was in turn placed between the two platens of a press, these platens having been preheated to 200° C.

The platens were brought into contact with the brass plates without applying pressure, and the entire apparatus was thus maintained for 20 minutes to allow the foam to expand.

The cellular material thus obtained, having a density of 0.12 was baked for an additional 24 hours at 250° C.

The compressive strength (10 percent compression) of a 5×5 cm sample, measured according to standard specification ASTM D 1621-64 (traverse speed: 2.5 mm/min.) was 5 kg/cm2.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An imido copolymer consisting essentially of the reaction product of copolymerization between (i) a bis-maleimide having the structural formula (I):

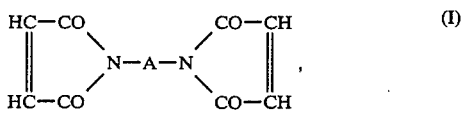

wherein A is phenylene or a divalent radical having the structural formula (II):

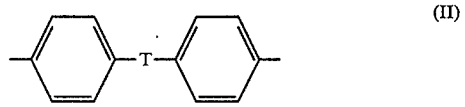

in which T is —CH$_2$—, —C(CH$_3$)$_2$—, —O—, or —SO$_2$—; and (ii) a (meth)-acrylic acid amide comonomer copolymerizable therewith, with the ratio of the number of imide functions to the number of moles of (meth)acrylic acid amide (ii) ranging from 0.25 to 8.

2. The copolymer as defined by claim 1, wherein the bis-maleimide (i) is selected from the group comprising N,N'-metaphenylene bis-maleimide, N,N'-4,4'-diphenylether bis-maleimide, N,N',4,4'-diphenyl-2,2-propyl bis-maleimide, N,N',4,4'-diphenylsulfone bis-maleimide and N,N',4,4'-diphenylmethane bis-maleimide.

3. The copolymer as defined by claim 2, wherein the bis-maleimide (i) is N,N',4,4'-diphenylmethane bis-maleimide.

4. The copolymer as defined in claim 1, said ratio ranging from 1.6 to 3.5.

5. The copolymer as defined by claim 1, said (meth)acrylic acid amide (ii) being selected from the group consisting of acrylamide, methacrylamide, and mixtures thereof.

6. The copolymer as defined by claim 5, said (meth)acrylic acid amide (ii) being acrylamide.

7. The copolymer as defined by claim 5, said (meth)acrylic acid amide (ii) being methacrylamide.

8. The copolymer as defined by claim 5, said (meth)acrylic acid amide (ii) being a mixture of acrylamide and methacrylamide.

9. The copolymer as defined by claim 5, the same being a thermoset copolymer.

10. A shaped article comprising the copolymer as defined by claim 9.

11. A process for preparing the copolymer as defined by claim 1, comprising heating said comonomers (i) and (ii) to a temperature of from 90° to 250° C.

12. The process as defined by claim 11, comprising bulk copolymerizing said comonomers until a homogeneous liquid results.

13. The process as defined by claim 12, said heating being at a temperature not in excess of 160° C.

14. The process as defined by claim 11, said comonomers being admixed with an inert organic diluent.

15. The process as defined by claim 11, further comprising heating the copolymer resulting therefrom to hardening temperatures.

16. The process as defined by claim 11, wherein said comonomers are homogenized prior to heating.

17. The process as defined by claim 11, comprising a solution copolymerization.

18. The process as defined by claim 11, comprising a suspension copolymerization.

19. The process as defined by claim 11, wherein the heating of the comonomers (i) and (ii) is conducted in the presence of a free-radical inhibitor.

20. The process as defined by claim 11, wherein the heating of the comonomers (i) and (ii) is conducted in the presence of a copolymerization catalyst.

21. A coating composition comprising the copolymer as defined by claim 5.

22. An adhesive composition comprising the copolymer as defined by claim 5.

23. An imido copolymer, comprising the reaction product of copolymerization obtained upon reacting the monomers consisting essentially of (i) a bis-maleimide having the structural formula

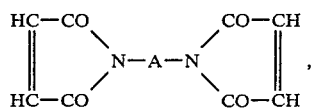

wherein A is phenylene or a divalent radical having the structural formula (II):

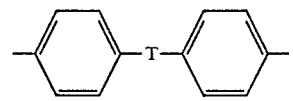

in which T is —CH$_2$—, —C(CH$_3$)$_2$—, —O—, or —SO$_2$—; and (ii) a (meth)acrylic acid amide comonomer copolymerizable therewith, with the ratio of the number of imide functions to the number of moles of (meth)acrylic acid amide (ii) ranging from 0.25 to 8.

24. The copolymer as defined by claim 23, wherein the bismaleimide (i) is N,N',4,4'-diphenylmethane bismaleimide.

25. An imido copolymer, comprising the reaction product of copolymerization between (i) a bis-maleimide having the structural formula (I):

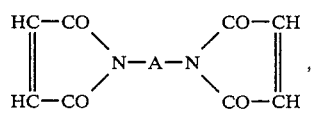

wherein A is phenylene or a divalent radical having the structural formula (II):

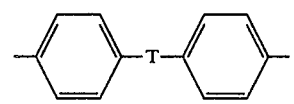

in which T is —CH$_2$—, —C(CH$_3$)$_2$—, —O— or —SO$_2$—, in admixture with a mono-imide, the number of imide functions in said mono-imide being up to 30% of the total number of imide functions in said admixture; and (ii) a (meth)acrylic acid amide comonomer copolymerizable therewith, with the ratio of the number of imide functions to the number of moles of (meth)acrylic acid amide (ii) ranging from 0.25 to 8.

* * * * *